(No Model.)

T. R. COOK.
SELF OPENING AND CLOSING GATE.

No. 574,667. Patented Jan. 5, 1897.

Witnesses,
Will Hafer
F. N. Worner

Inventor,
Thos. R. Cook,
By Joseph A. Minturn,
Attorney.

THE NORRIS PETERS CO., PHOTO-LITHO., WASHINGTON, D. C.

UNITED STATES PATENT OFFICE.

THOMAS R. COOK, OF MARION, INDIANA.

SELF OPENING AND CLOSING GATE.

SPECIFICATION forming part of Letters Patent No. 574,667, dated January 5, 1897.

Application filed May 22, 1896. Serial No. 592,619. (No model.)

*To all whom it may concern:*

Be it known that I, THOMAS R. COOK, a citizen of the United States, residing at Marion, in the county of Grant and State of Indiana, have invented certain new and useful Improvements in Self Opening and Closing Gates; and I do hereby declare the following to be a full, clear, and exact description of the invention, such as will enable others skilled in the art to which it appertains to make and use the same.

The object of this invention is to provide mechanism whereby the wheels of a vehicle in passing the opening closed by the gate will change the center of gravity of the gate, so as to cause the latter to swing by its own weight into an open position and by the action of the vehicle on the mechanism on the other side of the fence after passing through the gate change the center of gravity back to its first position, so as to cause the gate to close.

The object of the invention also is to provide a simple and reliable automatic locking device to hold the gate in position, either open or closed, and, further, to connect the crank with the trip-rods so as to permit the immediate return of the crank into a vertical position, but so that it will have liberty of action without influencing the gate except when it is proper for the gate to be operated thereby.

I accomplish the objects of this invention by the mechanism illustrated in the accompanying drawings, in which—

Figure 1:
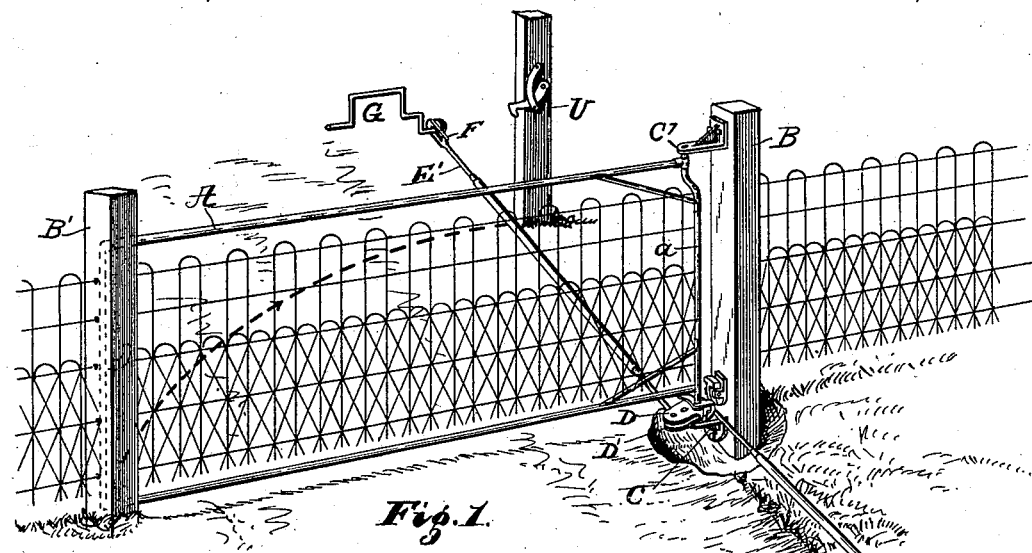
Figure 2:
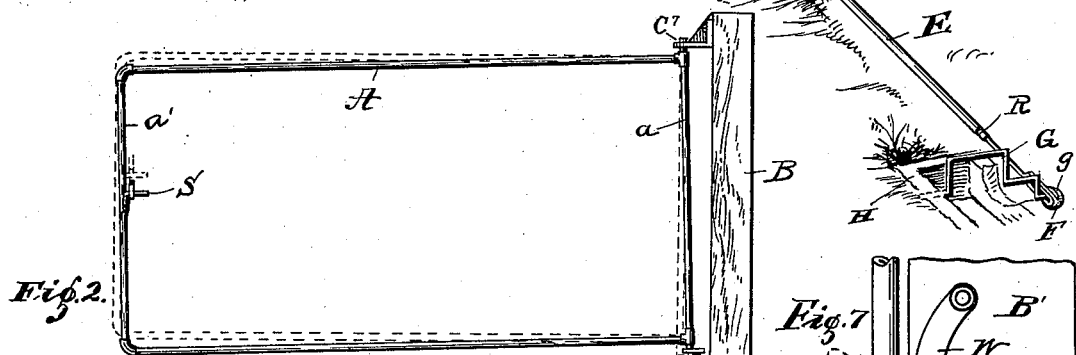
Figure 7:
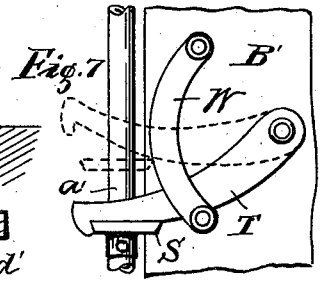
Figures 3, 5, 6:
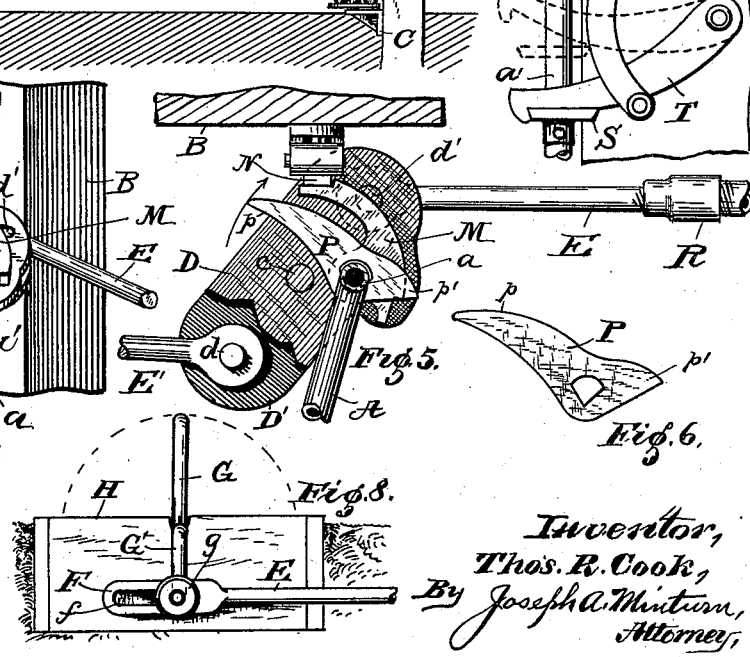
Figure 4:
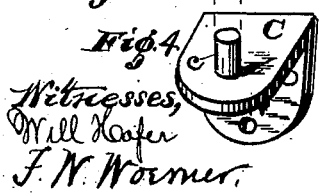
Figure 8:
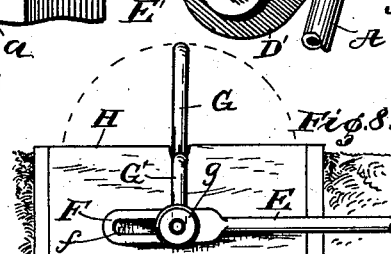

Figure 1 is a view in perspective of a gate equipped with my improved mechanism. The direction of movement of the gate in opening is shown by the heavy broken line. Fig. 2 is a view in side elevation of the frame of the gate and the post and castings by which the gate is hinged to the post. Fig. 3 is a detail in perspective, showing the horizontal plates supported by the gate-post and held from turning by the lock-pawl. Fig. 4 is a view in perspective of the hinge-bracket to support the horizontal plate. Fig. 5 is a plan view of the horizontal plates and details of attached mechanism. The upper plate is broken away to show the eye on the end of one of the connecting-rods. Figs. 3 and 5 represent the horizontal plates in the position they occupy after the operation of the crank, but before the gate has swung to its open position. Fig. 6 is a plan view of the cam for unlocking the horizontal plates by pushing the lock-pawl. Fig. 7 is a view in side elevation of the latch-hook for locking the gate. Fig. 8 is a view in side elevation of the trip-frame with the crank in vertical position and showing the slot in the end of the connecting-rod.

Similar letters of reference indicate like parts throughout the several views of the drawings.

A represents the gate, which may be of iron, as shown in the drawings, or of wood, and constructed in any rigid and substantial manner.

B is the hinge-post, which is set on the right-hand side of the driveway looking in the same direction in which the gate is to open. B' is the latch-post, set on the opposite side of the gateway from the hinge-post and forms a stop for the gate. It is provided with a latch, which will be described hereinafter.

C is a hinge-bracket which is fastened to the post B on a level with the highest point of ground over which the gate is to swing.

D and D' are a pair of plates, which I will designate as "horizontal" plates. They are provided with a central opening through which the standard c, integral with the hinge-bracket C, is projected, the said plates having free horizontal movement around said standard. On each side of the central opening for the standard c are the standards d and d', integral with the lower plate D' and projected up through openings in the upper plate D.

E and E' are the connecting-rods, having eyes on their inner ends, which are inserted between the plates D and D' and fit over the standards d and d' in the manner as shown in Figs. 3 and 5. The outer ends of the trip-rods terminate with the slotted heads F to receive the operating-cranks G. The shape of the cranks G is shown in Figs. 1 and 8. These cranks are mounted on a wooden frame H, which will be filled with gravel, and said cranks will be provided with the weights g to bring the cranks into a vertical position after the wheel of the vehicle has passed over them.

I is a socket formed in the top face of the upper plate D. Its purpose is to receive the lower end of the gate-stile $a$. The socket is at one side of the longitudinal center of the horizontal plates, as shown in Fig. 3, and is thus placed for the purpose of changing the center of gravity of the gate, the upper end of the stile $a$ being hinged to the bracket $C^7$ at a point in direct vertical alinement with the pivot $c$, on which the horizontal plates turn.

The gate is free to move under the impulse of its own weight, and the moment the stile $a$ is thrown out of a vertical plane the weight of the gate will cause it to swing till it comes again to an upright position. So if the gate is in its closed position and the bottom of the stile $a$ is thrown out a short distance in a direction at right angles to the gate the latter will swing around ninety degrees into an open position, and when the stile is returned to its first position the gate will swing back into closed position. This shifting of the lower end of the stile $a$ is accomplished by the action of the trip-rods on the horizontal plates, as will be fully understood from what has been previously said. The weight of the gate on the horizontal plates creates so much friction that the plates are frequently shifted by the movement of the gate, which at once changes the position of the stile $a$ and counteracts the result sought to be accomplished, and to prevent the movement of the horizontal plates I have provided a lock which consists of a rib M, integral with the upper surface of the plate D and concentric with the standard $c$. This rib terminates at each end with a notch $m$ or $m'$, into which the end of a weighted lock-pawl N enters and holds the horizontal plate until the pawl is pushed out of the notch. When the trip-rods are properly adjusted, the lock-pawl will catch at each end of the lock-rib. Fig. 3 shows the horizontal plates locked in their position after the operation of the crank G, but before the gate has swung to its open position. When the longitudinal center of the horizontal plates is in the plane $a\ a$, the gate is in its closed position. Fig. 5 illustrates the application of a cam P for pushing back the pawl and releasing the horizontal plates. The shape of the cam is illustrated in Fig. 6, and as there shown it is provided with an angular opening, into which a dowel to enter the hollow end of the stile $a$ and having a correspondingly-shaped portion is inserted, whereby the cam will turn with the gate. The two arms $p$ and $p'$ of the cam are proportioned so as to contact with the pawl and push it out of its notch when the gate has about reached its open or closed position. The length of the trip-rods is regulated by means of the threaded couplings R. The rods E and E', as shown in the drawings, are connected with the plates D D' so as to push and not pull the said plates. By connecting rod E at $d$ and rod E' at $d'$ the plates will be actuated by a pull instead of a push on said rods.

When the stile $a$ is thrown out of the vertical plane of the gate, the movement elevates the outer end of the gate in the manner indicated by the dotted lines in Fig. 2. This raising of the outer end of the gate is taken advantage of in providing an automatic latch to secure the gate against accidental movement.

S represents a horizontal latch-plate of considerable width which is secured to the stile $a'$ of the gate.

T is the latch-hook and is pivoted to the inside of the post B', so as to engage the latch-plate S. A guide-bar W allows of vertical movement of the latch-hook within prescribed limits. The shape of the body of the hook T is such that the upward movement of the plate S will raise the hook and disengage it from the plate in the manner as shown in Fig. 7 and permit the plate to move horizontally from the post without hindrance from the hook.

U is a post against which the gate strikes when it is opened. It has a latch-hook to hold the gate open, which operates in the manner just described.

Having thus fully described my invention, what I claim as new, and wish to secure by Letters Patent of the United States, is—

1. The combination, with a plate having oscillatory movement controlled by a passing vehicle, of a gate having an end stile pivoted at its upper end in vertical alinement with the pivot of the plate and having its lower end supported by the said plate at a point remote from the pivotal point of the said plate, the plate having notches substantially as described, to engage a pawl, a pivoted pawl to engage the notches of the plate and a cam moving with the gate and contacting with the pawl at certain positions of the gate for the purpose of releasing the plate, substantially as described.

2. The combination, with a gate, the outer end of which is elevated by the operation of opening and closing said gate, of a wide horizontal lock-plate secured to the front stile of the gate and a latch-hook pivotally secured to the gate-post and extending across the top of the lock-plate and engaging the inner edge of the plate, said hook being curved on its under side as shown and described so as to be raised up out of engagement with the plate on the gate by the elevation of the end of the gate, in the manner substantially as specified.

3. The combination, with a plate having horizontal oscillatory movement and having notches for locking the plate, a pair of cranks located one on each side of the plate and adapted to be actuated by the wheels of a passing vehicle and connecting-rods connecting the cranks with the plate so as to give the plate an oscillatory movement said rods having slotted heads as described, to receive the cranks, of a gate having one of its end stiles pivotally secured at a point in vertical alinement with the pivotal point of the plate and having its lower end supported by the plate at a point remote from the pivotal point of the plate, a pawl pivoted to the hinge-post of the gate so as to engage the notches in the oscillating plate and a cam moving with the gate and contacting with the pawl at certain positions of the gate, all substantially as described and for the purposes specified.

In testimony whereof I affix my signature in presence of two witnesses.

THOMAS R. COOK.

Witnesses:
JOSEPH A. MINTURN,
F. W. WOERNER.